(12) United States Patent
Glebov et al.

(10) Patent No.: US 7,072,117 B2
(45) Date of Patent: Jul. 4, 2006

(54) MICRO-LENS ARRAY

(75) Inventors: Alexei Glebov, San Mateo, CA (US);
Lidu Huang, Danville, CA (US);
Kishio Yokouchi, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/295,989

(22) Filed: Dec. 6, 2005

(65) Prior Publication Data

US 2006/0082885 A1    Apr. 20, 2006

Related U.S. Application Data

(62) Division of application No. 10/725,840, filed on Dec. 1, 2003, now Pat. No. 6,999,238.

(51) Int. Cl.
*G02B 26/00* (2006.01)
*G02B 27/10* (2006.01)

(52) U.S. Cl. ............... 359/619; 359/620; 359/820; 359/288

(58) Field of Classification Search ............ 359/290, 359/291, 619, 620, 820, 621, 622, 623, 288
See application file for complete search history.

(56) References Cited

U.S. PATENT DOCUMENTS

| | | | | |
|---|---|---|---|---|
| 3,765,749 | A | * | 10/1973 | LaMacchia ............ 359/291 |
| 4,872,743 | A | * | 10/1989 | Baba et al. ............ 359/298 |
| 5,737,120 | A | * | 4/1998 | Arriola ............ 359/356 |
| 5,986,811 | A | * | 11/1999 | Wohlstadter ............ 359/626 |
| 6,563,647 | B1 | * | 5/2003 | Fukuzawa ............ 359/620 |
| 6,582,988 | B1 | * | 6/2003 | Hsiao et al. ............ 438/70 |
| 6,587,147 | B1 | * | 7/2003 | Li ............ 348/340 |
| 2003/0214700 | A1 | * | 11/2003 | Sidorin et al. ............ 359/334 |

* cited by examiner

*Primary Examiner*—Hung Dang
*Assistant Examiner*—Brandi Thomas
(74) *Attorney, Agent, or Firm*—Sheppard Mullin Richter & Hampton LLP

(57) ABSTRACT

A tunable micro-lens and micro-lens array for use in optical communications are disclosed. The micro-lens uses thermo optical material and a temperature controller to adjust the temperature and, hence, the index of refraction of the thermo optical material. In one embodiment, a single temperature controller is used to maintain an array of micro-lenses at a desired temperature. In an alternate embodiment, the individual lenses in an array are separately tunable. The invention may be used with either 2D or 3D lenses, and is well suited for use with existing planar lightwave circuit (PLC) technology.

9 Claims, 5 Drawing Sheets

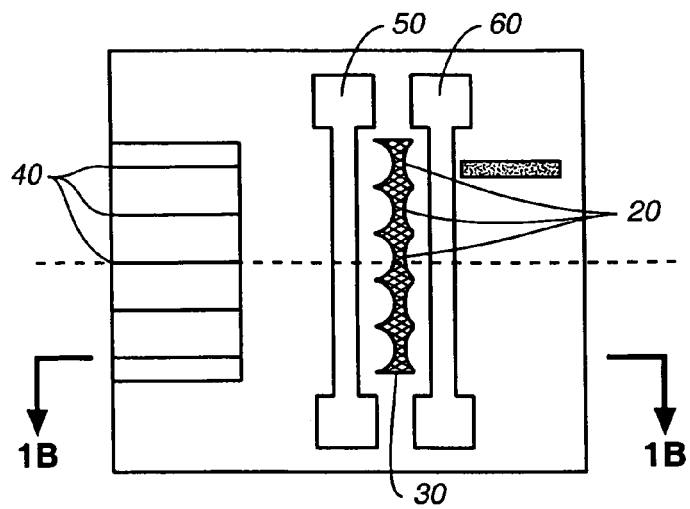
FIG._1A
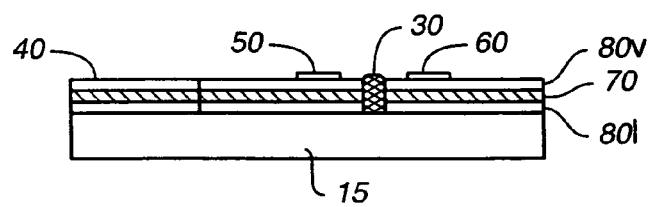
FIG._1B
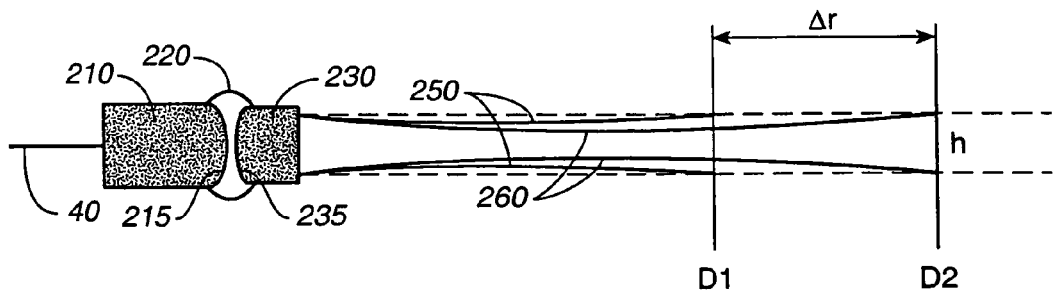
FIG._2A
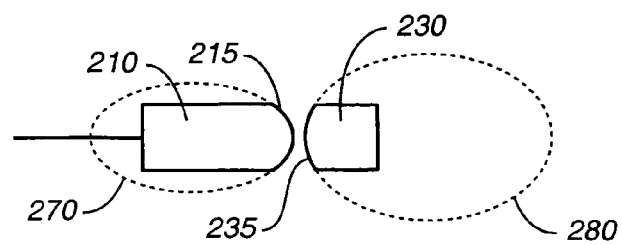
FIG._2B

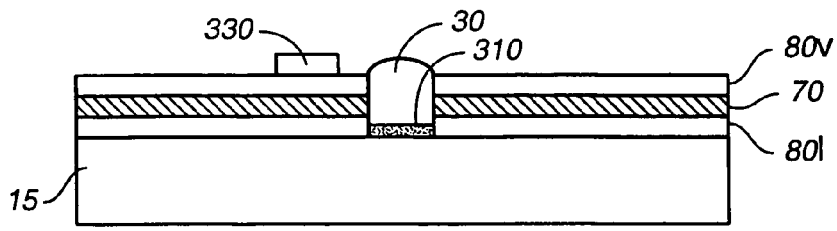
FIG._3A
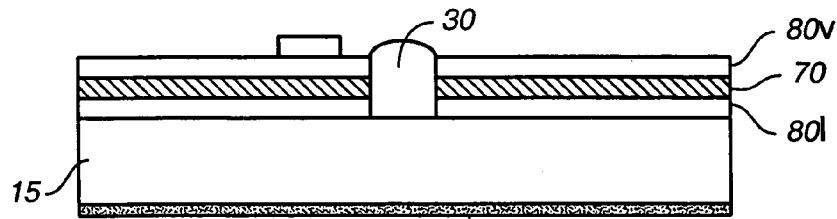
FIG._3B
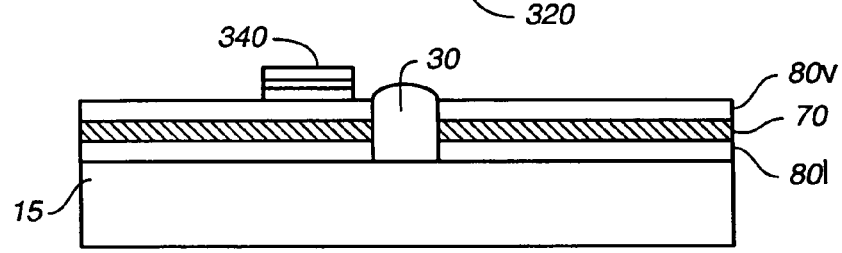
FIG._3C
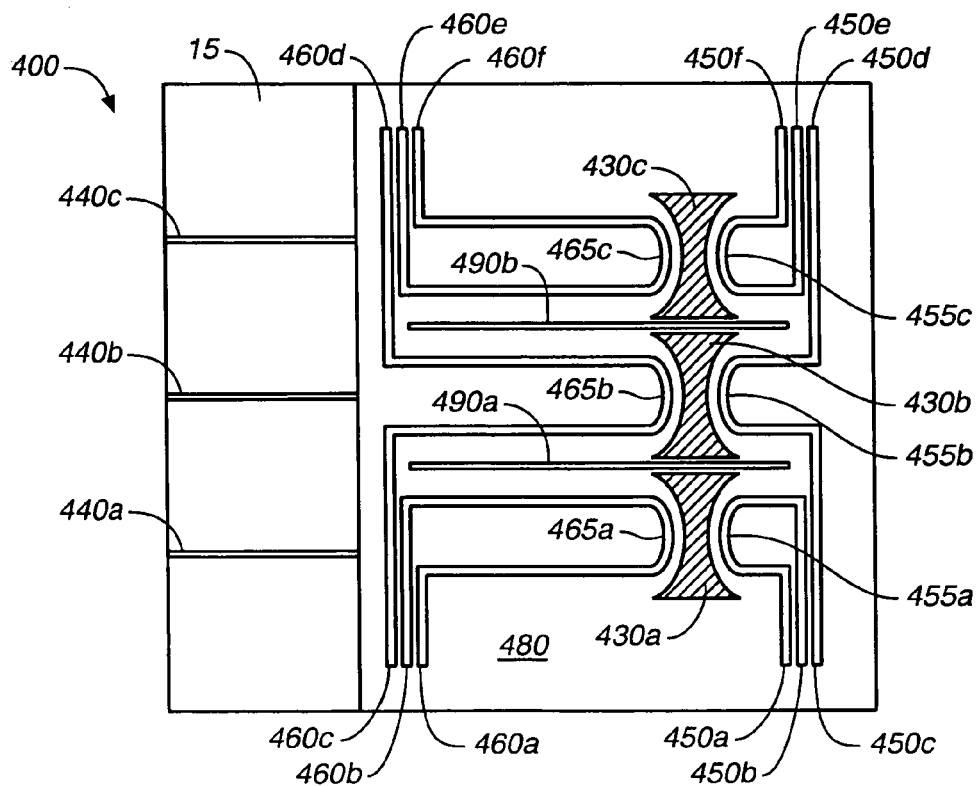
FIG._4

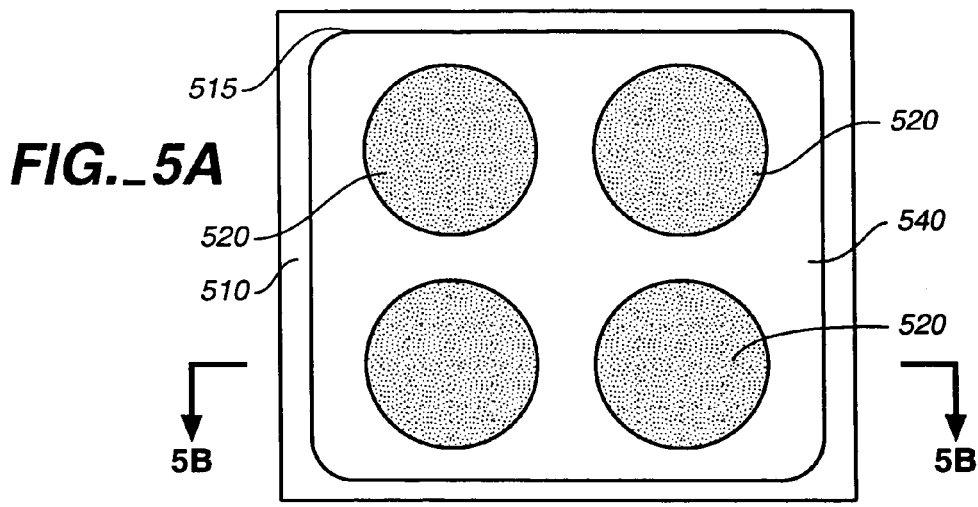
FIG._5A
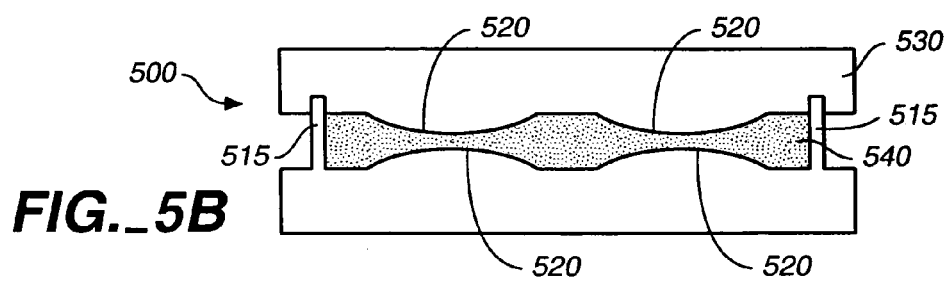
FIG._5B
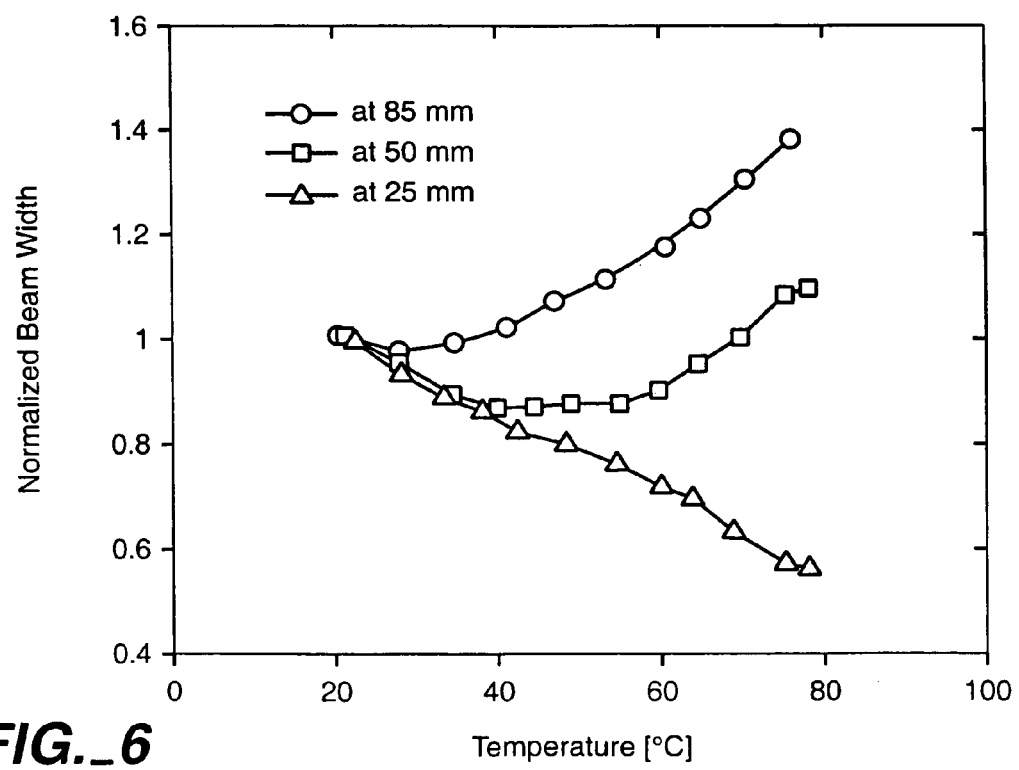
FIG._6

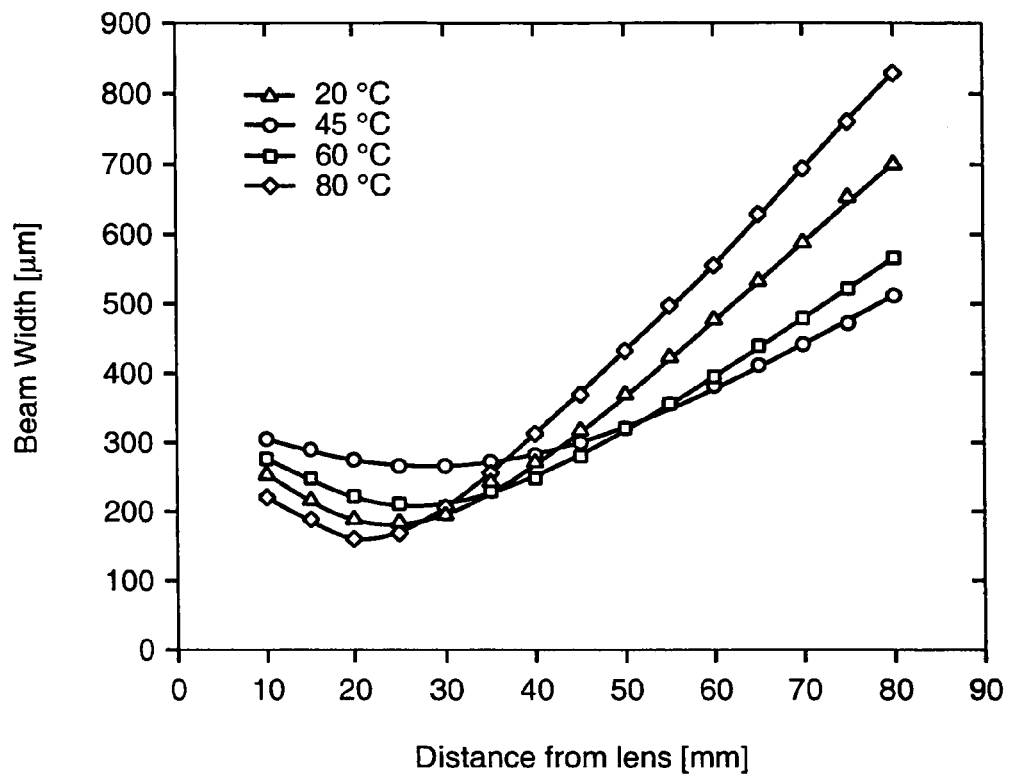
FIG._7
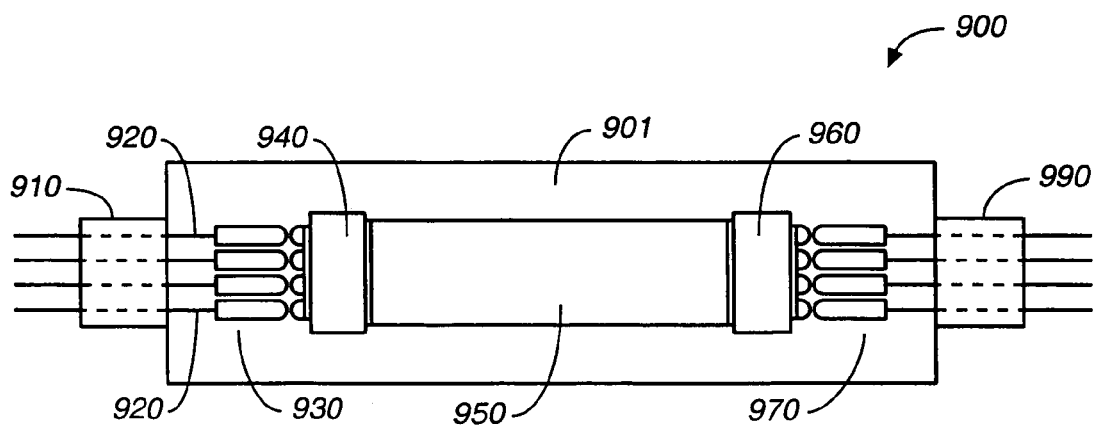
FIG._9

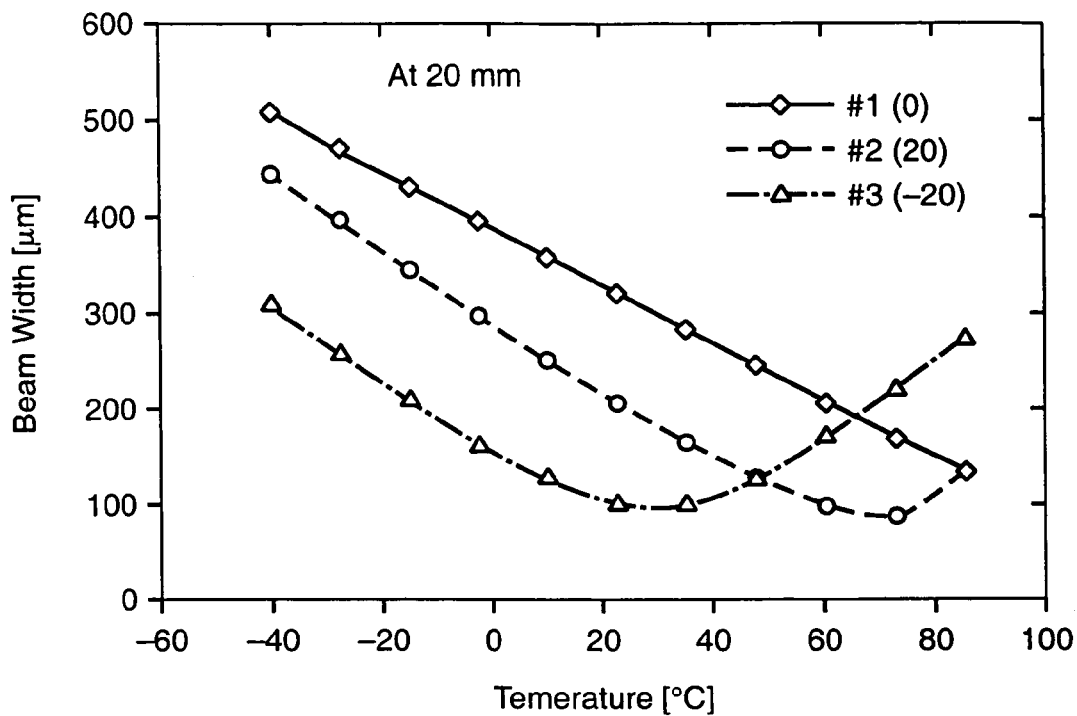
FIG._8A
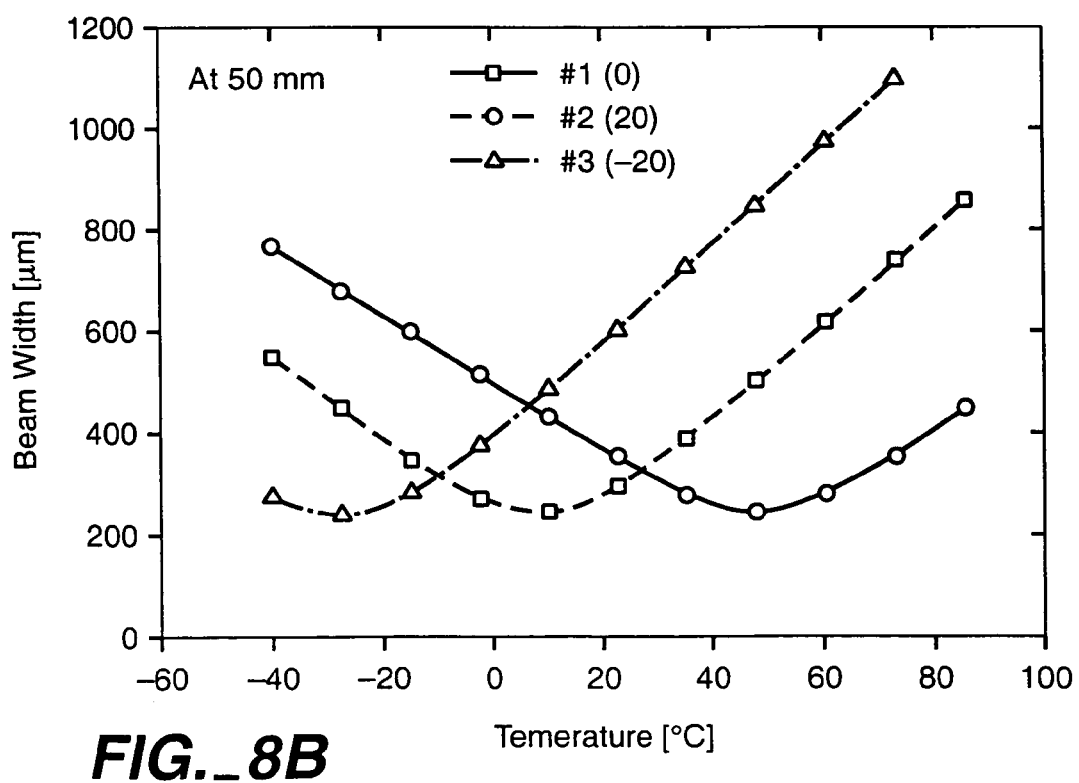
FIG._8B

MICRO-LENS ARRAY

CROSS-REFERENCE TO RELATED APPLICATION

This application claims priority as a division of allowed U.S. patent application Ser. No. 10/725,840 filed Dec. 1, 2003, now U.S. Pat. No. 6,999,238, published Jun. 2, 2005, (Pub. No. US 2005/0117195), the entire disclosure of which is incorporated by reference.

FIELD OF THE INVENTION

The present invention is directed to tunable optical lens designs and is more specifically directed to micro-lenses used in optical communications systems.

BACKGROUND OF THE INVENTION

Over the past decade considerable attention has been given to development of micro-optic lens arrays (MLA). Micro-optic lens arrays (also referred to as micro-lens arrays) have applications in many areas of optics, fiber communications and optical interconnects. With advances in dense wavelength division multiplexing (DWDM) networks, the need for multi-channel beam collimation and focusing has grown steadily. MLA structures may be employed for three-dimensional (3D) light beam collimation, for example, in 3D fiber array to fiber array connections or 3D microelectronic mechanical (MEM) optical switches. Two dimensional (2D) MLAs with light beam collimation, built using planar lightwave circuit (PLC) technology, are also widely used for planar optical devices. PLC devices have already occupied a prominent place in tele- and data communication systems, for example, monolithic and hybrid integration approaches have been developed or proposed for a number of active and passive networking devices such as multiplexers and demultiplexers, filters, attenuators, transceivers, switches, etc. In addition, 2D and 3D light guiding structures have been developed or proposed for low loss transmission of confined light modes.

Single mode transmission channel waveguides are typically used in DWDM networking devices. However, in such devices collimated beams are sometimes expected to propagate rather long distances without confinement in the direction parallel to the surface and perpendicular to the beam propagation. For such systems, 2D micro-optical lenses are required to collimate or focus the light in the lateral domain while the three layer waveguiding structure confines light in the vertical direction.

There is an overall need for tunable devices for use in photonic networks. The characteristics of optical devices and optical fibers may vary in use, depending on conditions such as ambient temperature, electromagnetic fields, and light wavelength. In order to minimize induced distortions it would be valuable to include tunable elements into such networks so that they can compensate for the variations of the other parameters. In case of micro-lenses, the tunability is also desirable because of the different paths that light can travel after exiting the lens. For example, in a non-blocking cross-connect switching device the light propagates very different distances for "off" and "on" states.

SUMMARY OF THE INVENTION

The present invention is related to micro-lens arrays for use in optical switching and optical communications. In a preferred embodiment, the present invention is directed to a tunable micro-lens comprising a first curved surface made of a first optically transparent material having a first index of refraction, a second surface made of second optically transparent material having a second index of refraction and which is, preferably, also curved, spaced apart from said first curved surface, a thermo-optical polymer located between and in contact with said first and second surfaces, the polymer having a third index of refraction different than said first index of refraction, and a temperature controller coupled to said polymer. The focal properties of the lens can be changed by adjusting the temperature of the thermo-optical polymer or the whole lens if the RI of the lens base material has different temperature dependence than the polymer in the lens gap. Preferably, the invention comprises either a two or three-dimensional an array of such lens, wherein the first and second curved surfaces are configured in a doubly concave arrangement, and wherein each of the curves are elliptical. The temperature controller may comprise one or more resistive heating elements, Peltier devices or combinations of resistive heating elements and Peltier devices. Where multiple temperature controllers are used, the lens array may comprise thermal barriers between adjacent temperature controlled regions to provide thermal isolation between regions.

In another aspect, the present invention comprises a method of making a micro lens array, comprising forming a plurality of first lens elements from an optically transparent material, each of said first lens elements having a curved light output surface, forming a plurality of second lens elements from an optically transparent material, each of said second lens elements being in spaced apart opposing relationship with a corresponding one of said first lens elements, thereby providing a plurality of lens element pairs defining gaps therebetween, filling said gaps with a liquid thermo-optical polymer, curing said thermo-optical polymer, and disposing a temperature controller proximate to said thermo-optical polymer.

Still another aspect of the present invention is directed to a method of reducing the temperature sensitivity of a lens system comprising a plurality of lens elements, at least one of the lens elements comprising thermo optical material, the method comprising choosing a desired beam width at a desired distance from the output of said lens system, determining the range of operating temperatures for said lens system, analyzing the relationship between the parameters of the lens system and the output beam width at said desired distance for a plurality of temperatures within said range of operating temperatures, wherein said parameters include the shape of the lens elements, the indices of refraction of the lens materials at each of said plurality of temperatures, and the nature of the interfaces between said lens elements, and based on said analysis, selecting parameters for said lens system which provide substantially said chosen beam width at said desired distance with the minimum amount of variability over said range of operating temperatures.

Another aspect of the present invention comprises a method of reducing the temperature sensitivity of a lens system comprising a plurality of lens elements, at least one of the lens elements comprising thermo optical material, comprising constructing a plurality of curves correlating the output beam width of the lens system at selected distances from the lens system with the temperature of the lens system, taking into account the indices of refraction of the materials used in the lens system, the shape of the lens elements used in the lens system, each of said curves have a minima whereat the temperature sensitivity of the lens system is relatively flat, and selecting a curve which has a minima in the vicinity of the desired operational parameters of the lens system, constructing a lens system associated with the selected curve.

Accordingly, it is an object of the present invention to provide a tunable micro-lens or array of tunable lenses using a thermo optical material so that the focal property of the lenses can be adjusted by controlling the temperature of the lenses.

Another object of the present invention is to provide an method of making a tunable micro-lens or array of tunable micro-lenses using thermo optical material.

A further object of the present invention is to provide a method of selecting the parameters of a lens incorporating thermo optical material such that the optical properties of the lens is relatively insensitive to temperature changes in the operating region.

Further objects of the invention will be apparent to those skilled in the art after reading the description of the invention in connection with the drawings and appended claims.

BRIEF DESCRIPTION OF THE DRAWINGS

FIGS. 1A and 1B are schematic plan and cross-sectional views, respectively, of a first embodiment of a two-dimensional lens array of the present invention.

FIG. 2A is a schematic cross-sectional view of a tunable lens of the present invention showing different beam profiles. FIG. 2B is a detail depicting the elliptical shape of the preferred lens elements of the present invention.

FIGS. 3A, 3B and 3C are schematic cross sectional views of a tunable lens of the present invention depicting alternative heater arrangements.

FIG. 4 is schematic plan views of a further embodiment of the present invention showing thermal barriers.

FIGS. 5A and 5B are schematic elevation and cross-sectional views, respectively, of an embodiment of a three-dimensional lens array of the present invention.

FIG. 6 is a graph showing the relationship between beam width and temperature for an embodiment of the present invention.

FIG. 7 is a graph showing the relationship between beam width and distance from the lens for an embodiment of the present invention.

FIGS. 8A and 8B are graphs showing the relationship between beam width and temperature for various constructions of the present invention.

FIG. 9 is a schematic plan view of an optical switch incorporating the present invention.

DETAILED DESCRIPTION

As described above, as recognized by the present inventors, there are a variety of reasons why its is desirable to use tunable micro-lenses and micro-lens arrays in various types of optical systems and devices. Changes in environmental conditions (e.g., temperature), light wavelength, polarization states, etc., over time can cause deviations in system or device performance. Other devices in the optical system may have requirements which vary over time. Likewise, manufacturing variability can cause differences in device performance which can be addressed by tuning the system.

Some optical devices, such as switches, have arrays of closely packed input and output channels. Such devices require the ability to produce collimated light beams which traverse distances as great as 10–15 cm. The pitch of adjacent channels can be as small as 500 microns, requiring that the beam width be kept below 450 microns. Keeping beam widths within these limits requires cross-collimation rather than parallel beam propagation. Cross-collimated beam width varies as function of distance between the input and output, light wavelength, etc. While it is known to use lenses and lens arrays in optical switching, integrated laser coupling and other applications, the inventors have recognized the increasing importance of the ability to actively control and adjust the beam shape. These needs exist both in planar (2D) and 3D systems. The present invention has been used to provide collimated light beams at 1550 nm with a final beam width less than 450 microns over a distance of 10 cm, and which are thermally tunable within ±40% of their original size at different distances from the lens output.

FIG. 1A depicts an exemplary first embodiment of a tunable lens array 10 of the present invention, comprising five doubly concave two-dimensional (2D) lenses 20 arranged along an line perpendicular to the optical axes of the lenses. In the embodiment of FIG. 1A, each of the individual lenses is substantially identical. Each lens consists of two curved refracting surfaces 20a and 20b which are, in the embodiment depicted, formed in an optically transparent material such as silica, with a thermo optical (TO) polymer 30 filling the space between the curved surfaces. As used in the present application, the term optically transparent is relative to the specific wavelengths used in the system. For example, typical wavelengths used in an optical communication network are 1550 or 1320 nm. As shown, the refracting surfaces 20a and 20b of each lens in an array are constructed in opposing spaced apart relationship or a so called double concave gap. A double convex gap is also possible but in this case the RI of the polymer material filling the gap should be higher than the RI of the lens base.

An input waveguide 40 is positioned on the optical axis of each of the lenses 20, directing light signals to the lenses. Resistive heating elements 50 and 60 are formed on the lens array near the TO material to provide operational control of the temperature, and hence refractive properties, of the TO material. Heating elements 50, 60 are coupled to a controller (not shown) which controls the temperature by regulating the current flow to the heating elements. One or more temperature sensors (e.g., thermocouples) coupled to the controller may also be positioned on the lens array to monitor the temperature of the TO material. While two resistive heating elements are shown in FIG. 1A, any suitable means of controlling the temperature of the TO material may be used. Alternative structures for controlling the temperature are depicted, for example, in FIGS. 3A and 3B.

While FIG. 1A shows the use of input channel waveguides, it is possible to connect the lens array directly to the outputs of optical fibers or other light sources to reduce insertion losses. However, this alternative is not presently preferred as it adds complexity.

FIG. 1B is a cross-sectional view of the 2D lens array of FIG. 1A along view lines 1B—1B. As shown in FIG. 1B, 2D lens array 10 is formed on a substrate 15 of any suitable material, such as silicon, glass, etc. Input light waveguide 40 is coupled to an optically transparent light transmission or core layer 70 in the lens array, which is sandwiched between upper and lower optical confinement or cladding layers 80u and 80l, which RI is slightly lower than that of the core layer. TO polymer 30 fills the space between the opposing refractive surfaces of light transmission layer 70, and heating elements 50 and 60 are formed on top of upper light confinement layer 80u, adjacent to TO material 80.

The lens structure of FIGS. 1A and 1B may be fabricated using standard silica-on-silicon PLC technology. In an exemplary embodiment, a silicon substrate is thermally oxidized to provide the lower cladding layer, and the core and upper cladding layers are added by chemical vapor deposition. Thus, in this exemplary embodiment, the core and cladding layers are all formed of silica ($SiO_2$). Reactive ion etching (RIE) is then used, in connection with photolithography, to shape the silica lens surfaces. RIE results in lens walls that are very smooth and substantially vertical (i.e., between 86° and 90°). The cavity between the lens surfaces is then filled with a thermo optical polymer and cured. The resistive heating elements and an optional thermocouple are then added using conventional methods.

Those skilled in the art will appreciate that light entering the lens from the input channel waveguide is no longer confined laterally and diverges due to diffraction. To minimize light dispersion within the lens, and thereby minimize the coupling loss, the gap between the two opposing curved silica lens surfaces should, preferably, be kept small.

As is well known, the index of refraction of TO material varies with the temperature of the material. While many materials have an index of refraction which exhibits some degree of temperature dependence, the relative temperature dependence dn/dT is relatively larger for TO material. The present invention relies on the fact that the value of dn/dT for TO material 30 is much larger than for the adjacent optically transparent material in light transmission layer 70. For example, the value of dn/dT of $SiO_2$ is of the order of $10^{-6}$, between one and two orders of magnitude less than the value of dn/dT of typical thermo optical polymers. Thus, as a practical matter, in most instances temperature variability of the indices of refraction of the other lens components can be ignored. Suitable TO materials include acrylate monomers, amorphous fluorocarbon polymers, polystyrenes, polyimides, PMMA, FPE, etc. Preferably, the index of refraction of the selected polymer is lower than the index of refraction of the other lens elements. Methods of adjusting the composition of optical polymers to achieve a desired index of refraction are known.

FIG. 2A is a schematic plan view of an embodiment of a 2D lens 20 according to the present invention, depicting two different beam profiles associated with two different lens operating temperatures. Input side lens element 210 and output lens element 230 are made of an optically transparent material, such as silica. In the preferred embodiment lens elements 210 and 230 are made of the same material, for ease of fabrication. However, it is not essential that the same material be used for the input and output side lens elements. Input lens element receives light, such as an optical communication signal, from a input channel waveguide 40. After transiting lens element 210, the light signal exits the element at a curved interface 215 between lens element 210 and TO material 220, where it is refracted, in accordance with Snell's law, as a function of the difference between the index of refraction of the lens element and the index of refraction of the TO material. Thereafter, the light is again refracted at interface 235 between TO material 220 and output lens element 230. Thus, in the illustrative embodiment, lens elements 210 and 230, in combination with TO material 220, form a two-dimensional double concave lens. A temperature controller (not shown in FIG. 2A) is used to control the operating temperature of lens 210.

In a preferred embodiment, interfaces 215 and 235 each have a symmetrical curve in the two-dimensional plane of the lens which forms a portion or arc of an ellipse. A schematic view of exemplary elliptical lens elements is shown more clearly in FIG. 2B. As depicted, the curvature may differ between the two lens interfaces, i.e., the curves lie upon different ellipses. In FIG. 2B the ellipse 270 associated with the first (input) lens element 210 is smaller than the ellipse 280 associated the second (output) lens element 230. The major axis of ellipses 270 and 280 both lie on the optical axis of the lens. Elliptical surfaces are preferred over spherical surfaces because of the aberrations associated with spherical lenses. The shape of the lens surfaces and the index of refraction of the selected TO polymer combine to define the optical properties of the lens.

FIG. 2A depicts two output beam profiles associated with different operating temperatures of lens 210—a first output beam profile 250 associated with a first lens operating temperature T1, and a second output beam profile 260 associated with a second lens operating temperature T2. In this exemplary depiction, beam profile 250 has a width h at a distance D1 from the exit surface of output lens element 230, while beam profile 260 has width h at a distance D2. Thus, by controlling the temperature of the TO material in the lens in the range from T1–T2, it is possible to control the point at which the output beam has a desired width h in the range D1–D2. According to the present invention, width h may be 450 microns or less.

FIGS. 3A, 3B and 3C are schematic cross-sectional views of lenses of the present invention, which are the same as the lens depicted in FIG. 1B, but with alternative temperature controlling elements. The elements in FIGS. 3A, 3B and 3C which are common with those in FIG. 1B have the same numbers and will not be described again. FIG. 3A shows a resistive heater 310 which is formed directly below and in direct contact with the TO polymer. As previously described, in one method of making the lens of FIG. 3A, the layers 801, 70 and 80$u$ are formed on substrate 15, and a suitably shaped cavity is created by etching through these layers using standard photolithographic technology. A resistive material is then deposited at the bottom of the cavity, such as by any of a number of known deposition techniques, and electrical contacts (not shown) are formed at the ends of the resistive material, away from the operational areas of the lenses. The electrical contacts are then coupled to a controller which supplies a desired electrical current to heater 310, thereby controlling the temperature of TO material 310. As depicted in FIG. 1A, the cavity may extend across a plurality of lens in a linear array. Alternatively, one cavity and one resistive heater may be formed for each lens in an array, in order to provide individual an heating element for each of the lenses. The structure of FIG. 3A is useful in applications where rapid changes to the refractive properties (e.g., focal length) of the lenses are important or desired. Because the heater is in direct contact with the TO material thermal energy can be rapidly transferred to the material. In this case the output beam size can be varied in several milliseconds.

FIG. 3A also shows a thermocouple 330, formed on the surface of the lens proximate to TO material 30, for sensing the temperature. Thermocouple 330 may be formed by conventional methods, and may be used as part of the temperature control system for maintaining a desired temperature.

FIG. 3B shows an embodiment where heater 320 is formed on the bottom surface of substrate 15. This embodiment has the advantage of relative ease of manufacture, and is suitable for use where rapid changes to the lens refractive properties are not required. For example, in many applications, it is desirable to fine tune the final lens (or lens array), after is has been constructed, to compensate for manufacturing or variations changed in operational conditions. In such circumstances, the lens or lens array may only need to be maintained at a single, uniform temperature.

FIG. 3C shows an embodiment of the present invention which is similar to the others, but which uses a Peltier device, 340, instead of a resistive heater, to control the temperature of the TO material. The use of a Peltier device provides better control over the individual lenses in an array, as is described below in connection with FIG. 4.

FIG. 4 is a schematic plan view of yet another embodiment of the present invention employing thermal barriers between adjacent lenses to facilitate individual control over the lenses. To facilitate understanding, lens array 400 is depicted having only three lenses. A channel waveguide input 440 conveys light signals to the lens array, where the signals enter the slab waveguide 480, similar in structure to what has previously been described. The core of each lens comprises TO material which, unlike the prior embodiments, is isolated from the TO material used in the adjacent lens. Thus, three separate areas of TO material are shown, 430a, 430b and 430c, one for each of the lenses. A pair of heaters is associated with each of the lens, formed on top of waveguide 480 on either side of the TO material. Thus, adjacent to TO material 430a are resistive heaters 455a and 465a, etc. Conductive lead lines are used to operationally connect heaters 455a, 455b, 455c, 465a, 465b and 465c to a controller (not shown). Thus, a current path for resistive heater 465a includes conductive leads 460a and 460c, and a current path for resistive heater 455a includes conductive leads 450a and 450b, etc. The adjacent lenses are thermally isolated by thermal barriers 490a and 490b. Thermal barriers 490a, 490b may be formed, for example, by creating grooves in slab waveguide 480 and filling them with any suitably compatible material with a very low thermal conductivity. In some embodiments air may be sufficient as a fill material. Grooves in waveguide 480 may be formed by well-known photolithography/etching processes. To enhance the thermal isolation of adjacent lenses, thermal barriers 490a, 490b preferably extend through the entire thickness of slab waveguide 480, and partially or wholly into the underlying substrate. This structure allows for individual control over the temperature (and thereby the refractive properties) of each lens in lens array 400.

As noted above, it the use of Peltier devices instead of resistive heaters may provide additional control. While Peltier devices are more difficult and expensive to construct, they allow for better temperature control, particularly in applications where it is desired to control the temperature of the individual lenses in a lens array. Peltier devices may be operated to either heat or cool the TO material associated with a particular lens by reversing the current. In some cases, thermal barriers alone may not be sufficient if there is a need to maintain a large temperature difference between adjacent lenses for an extended time period. Thus, for example, if lens 430a is operated at high temperature relative to lens 430b for an extended time period, heat may eventually migrate through the thermal barrier to adjacent lens 430b. Peltier devices can be used in a cooling mode to remove an heat which migrates through thermal barrier 490a. In yet another embodiment, both resistive heaters and Peltier devices may be used.

FIGS. 5A and 5B show elevation and cross section views of a three-dimensional (3D) lens array 500 of another embodiment of the present invention. Opposing substrates 510 and 530 formed from an optically transparent material such as silica, are held in a predetermined spaced apart relationship by alignment rim 515. A plurality of curved surfaces 520 are formed on the interior surfaces of substrates 510 and 530, such that when the substrates are in position, pairs of curved surfaces are in an opposing relationship. Curved surfaces 520 may have any suitable shape consistent with the optical needs of the system in which lens array 500 is used. For example, curved surfaces 520 may be shaped to consist of a portion of a sphere or ellipsoid. Curved surfaces 520 may be formed by any suitable process, such as gray scale photolithography or other etching techniques. While FIGS. 5A and 5B depict curved surfaces 520 that are all identical, it is contemplated by the inventors that the different ones of the curved surfaces may have different shapes. For example, the curved surfaces on substrate 510 may be different than the curved surfaces on substrate 530, or even the curved surfaces on a single substrate may vary.

The volume between optical substrates 510, 530 is filled with TO material 540. A temperature controller, such as resistive heater 550 is formed on the surface of substrates 510 and/or 530, to control the optical properties (i.e., the index of refraction) of TO material 540. Thus, 3D lens array 500 comprises a plurality of double concave lenses, wherein light is refracted as it crosses the interface between a curved surface 520 and TO material 540, and then again as it leaves the TO material at an opposing curved surface. Those skilled in the art will appreciate that 3D lens array 500 operates in the same manner as the lenses previously described, however light will be refracted by the lens in three dimensions rather than two.

FIG. 6 is a graph showing the relationship between measured beam width at several and distances from the lens and the temperature of the lens for an embodiment of the present invention. Test devices similar in structure to the embodiment of FIG. 1B, were fabricated using silica-on-silicon technology. Planar light guides for vertical light confinement were formed by deposition of a three-layer stack consisting of a lower cladding, a core, and an upper cladding. The lower cladding layer was formed by thermal oxidation of the silicon substrates. The core and upper cladding layers were formed by chemical vapor deposition of doped silica layers. The thicknesses of the lower and upper cladding layers were about 15 µm, while the core layer was about 5–6 µm. The test structures had a refractive index ratio between the core and cladding layer of $\Delta n$ ~0.78%. Channel waveguides for the lens arrays were formed by RIE. A cavity between the two vertical curves surfaces of the lenses were etched by a deep RIE process, and was then filled with an amorphous fluorocarbon polymer Cytop from Asahi Glass Co. The polymer had refractive index of 1.333 and transmittance better than 95% at 1550 nm wavelength. The material was cured in a two-step process: a preliminary cure at room temperature for 2 to 3 hours, followed by a final cure at 180° C. for 60 min. The arrays were then diced and the input and output ends were polished optically.

The beam widths were measured at 25, 50, and 85 mm away from the lens output after propagation in a silica slab waveguide. The temperature of the lenses was varied from 20° C. to about 80° C. The measured beam widths were normalized to the room temperature beam width. At 85 mm a 60° change in temperature resulted in the beam broadening by about 40%. At 50 mm the beam went through a minimum at T≈50° C. and then started increasing. At 25 mm the beam width decreased by about 40% at the same temperature range. The results of this testing demonstrate that the beam width of the light can be varied by ±40% in the temperature range of 60° C. The lenses can be designed so that they can be tuned in either direction, i.e., to increase or decrease the beam width. This allows very flexible tunability of the lenses in a rather wide range of beam widths.

FIG. 7 is a graph showing the relationship between beam width as a function of distance from the lens for four different operating temperatures spanning the range 20° C.–80° C., measured in air. The lenses used to obtain this data were constructed in the same manner as those described in connection with FIG. 6. While it will be appreciated that the beams behave differently in air than in silica, FIG. 7 shows how the focal length and beam profile of the lens varies with temperature.

FIGS. 8A and 8B are graphs depicting beam width as a function of temperature for three different lens designs as calculated using the beam propagation method (BPM). Both FIGS. 8A and 8B provide data from the same three lens designs over a range in temperatures of—40° C. to about 80° C. FIG. 8A depicts beam width at 20 mm and FIG. 8B depicts beam width at 50 mm. In each lens, the input side of the lens had the same shape—an arc of an ellipse having a major axis of 944 microns and a minor axis of 470 microns. However, the output side of the lens had a variable shape. In each instance the major axis on the output side was 2103 microns, but the minor axis was adjusted in 20 micron increments—the minor axes of the output in the three different lens were set at 1026, 1046 and 1066 microns, respectively. FIGS. 8A and 8B refer to "0" "20" and "–20" curves (diamonds, circles and triangles, respectively). The curve for the lens having a 1046.1 minor axis was designated "0" and the other designations reflect dimensions which are either 20 microns larger or smaller.

As can be seen from FIGS. 8A and 8B, each of the curves has a different minima which is a function of the lens shape. The shape of each curve in the vicinity of the minima is relatively flat, providing an operating region which is relatively temperature insensitive. Using this information it is possible to construct a micro-lens with a polymer having a relatively large dn/dT but which is, nonetheless, relatively temperature insensitive in a desired range of operating temperatures.

Thus, one aspect of the present invention, comprises a method of constructing a micro-lens having a thermo optical or other temperature sensitive polymer. According to the inventive method, one first generates a plurality of curves correlating the output beam width of the micro-lens at a selected distance (or selected distances) from the lens output. These curves are generated taking into account the indices of refraction of the lens materials and the shape of the lens elements. These curves may be generated using computing modeling techniques, such as the beam propagation method. As shown by the present inventors, these curves will have minima and are relatively flat in relation to the other portions of the curves. The lens designer then selects the curve which has its minima associated with the desired operational parameters of the lens, e.g., temperature, beam distance, etc., and constructs a lens associated with the selected curve.

More generally, according to the present invention, the lens designer may use data such as that depicted in FIGS. 8A and 8B to reduce the temperature sensitivity of a micro-lens which incorporates a relatively temperature sensitive polymer as a lens element. Thus, according to a more general method, the lens designer starts with knowledge of the desired beam width at a desired distance from the lens output, and with knowledge of the intended operating temperature range of the lens. The designer then analyzes the relationship between the parameters of the lens system and the output beam width over a range of temperatures spanning the intended operating temperature range of the lens. The parameters which are analyzed include at least the shape of the lens elements and the indices of refraction of the lens elements at a plurality of temperatures within the range, and the nature of the interfaces between the lens elements. The designer then uses this analysis to minimize the temperature related variability of the final lens design. It will be appreciated that the indices of refraction of the lens elements may vary as a function of light wavelength and, therefore, this may also be a parameter to include in the analysis.

The curves depicted in FIGS. 8A and 8B have a relatively constant slope in those portions which are not close to their minima. Thus, the information can also be used to maximize the temperature sensitivity of a lens, by ensuring that the lens is designed to operate in a region that is away a minima.

FIG. 9 shows an exemplary optical switch 900 using micro lens arrays of the present invention. For clarity only four input and output channels are shown. Optical switch comprises an input fiber array 910 comprising a plurality of optical fibers which terminate at the input channel waveguides 920. Channel waveguides 920 lead to input lens array 930. Output from lens array 930 is transmitted to input active element 940, which may, for example, comprise switching elements for redirecting the path of light received in one input channel to a selected different output channel. Any of a variety of known switching elements may be used. Light is transmitted from input active element 940 to output active element 960, through slab waveguide 950. The light received by output active element 960 is then directed to one of the lenses in output lens array 970, then to output channel waveguides 980 and finally to output fiber array 990. Apart from the input and output fiber arrays, 910, 990, the remaining elements may be constructed on a silicon substrate 901 using conventional PLC technology as previously described.

While the present invention has been particularly described with respect to the illustrated embodiments, various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

We claim:

1. A method of reducing the temperature sensitivity of a lens system comprising a plurality of lens elements, at least one of the lens elements comprising thermo optical material, comprising:
   generating a plurality of curves correlating the output beam width of the lens system at selected distances from the lens system with the temperature of the lens system, taking into account the indices of refraction of the materials used in the lens system and the shape of the lens elements used in the lens system, such that each of said curves has a minima whereat the temperature sensitivity of the lens system is relatively flat, and
   selecting a curve which has a minima in the vicinity of the desired operational parameters of the lens system,
   constructing a lens system associated with the selected curve.

2. The method of claim 1 wherein said step of generating a plurality of curves comprises using computer modeling.

3. The method of claim 2 wherein said computer modeling comprises a beam propagation method.

4. The method of claim 1 wherein said operational parameters comprises temperature.

5. The method of claim 1 wherein said operational parameters comprises beam distance.

6. A method of reducing the temperature sensitivity of a lens system comprising a plurality of lens elements, at least one of the lens elements comprising thermo optical material, comprising:
choosing a desired beam width at a desired distance from the output of said lens system,
choosing a desired range of operating temperatures for said lens system,
analyzing the relationship between parameters of the lens system and the output beam width at said desired distance for a plurality of temperatures, wherein said parameters include the shape of the lens elements, the indices of refraction of the lens materials at each of said plurality of temperatures, and the nature of the interfaces between said lens elements, and
based on said analysis, selecting parameters for said lens system which provide substantially said chosen beam width at said desired distance with the minimum amount of variability over said range of operating temperatures.

7. The method of claim 6 wherein said step of analyzing comprises computer modeling.

8. The method of claim 6 wherein said computer modeling comprises a beam propagation method.

9. The method of claim 6 wherein said step of analyzing comprises generating a plurality of curves correlating the output beam width of the lens system at selected distances from the lens system with the temperature of the lens system.

* * * * *